United States Patent
Exner et al.

(10) Patent No.: US 6,255,427 B1
(45) Date of Patent: Jul. 3, 2001

(54) AMPHOTERIC POLYMER DISPERSION

(75) Inventors: Reiner Exner, Bad Duerkheim; Hasen Ulubay, Dannstandt-Schauernheim; Karl Hetterich, Deidesheim, all of (DE)

(73) Assignee: Giulini Chemie GmbH, Ludwigshafen (DE)

( * ) Notice: Subject to any disclaimer, the term of this patent is extended or adjusted under 35 U.S.C. 154(b) by 0 days.

(21) Appl. No.: 09/229,627

(22) Filed: Jan. 13, 1999

Related U.S. Application Data

(62) Division of application No. 08/737,782, filed as application No. PCT/EP96/01193 on Mar. 20, 1996, now Pat. No. 5,925,722.

(30) Foreign Application Priority Data

Mar. 24, 1995 (EP) .................................... 95104369

(51) Int. Cl.$^7$ ..................... C08F 251/00; C08F 258/00; C09D 151/02
(52) U.S. Cl. ................ 527/300; 527/306; 527/309; 527/310; 527/311; 527/312; 527/313; 527/314
(58) Field of Search .................... 527/300, 306, 527/309, 310, 311, 312, 313, 314

(56) References Cited

U.S. PATENT DOCUMENTS

| | | | |
|---|---|---|---|
| 4,525,519 | * 6/1985 | Leising | 524/457 |
| 4,552,940 | 11/1985 | Van Eenam | 527/312 |
| 4,857,585 | * 8/1989 | Leising | 524/815 |
| 5,243,008 | 9/1993 | Ahmed et al. | 527/309 |
| 5,925,722 | * 7/1999 | Exner et al. | 527/300 |

FOREIGN PATENT DOCUMENTS

| | | |
|---|---|---|
| 0276770 | * 1/1988 | (EP) . |
| 0276770 | 8/1988 | (EP) . |
| 0479245 | 4/1992 | (EP) . |
| 0536597 | * 9/1992 | (EP) . |
| 0536597 | 4/1993 | (EP) . |
| 932389 | * 7/1963 | (GB) . |

OTHER PUBLICATIONS

Database WPI, Section Ch., Week 9144, Derwent Publications Ltd., London, Great Britain, Class A97, AN 91–320747, P002006199, "Surface crack–free paper prodn.—by adding amphoteric, graft polymer of starch to pulp slurry and forming paper from slurry", and JP, A, 03 213 597 (Seiko Chem. Ind. K.K.), Sep. 18, 1991.

* cited by examiner

*Primary Examiner*—P. Hampton-Hightower
(74) *Attorney, Agent, or Firm*—Venable; George H. Spencer; Ashley J. Wells

(57) ABSTRACT

An amphoteric polymer dispersion obtained in the presence of at least one of starch or a starch derivative by a two-stage polymerization using anionic and cationic monomers is useful as a sizing agent for paper products, as a coating for various substrates, and as a binder in pigment-free coatings or pigment-containing coatings. The dispersion is exceptionally compatible with widely differing sizing agent systems and coating chemicals.

7 Claims, No Drawings

AMPHOTERIC POLYMER DISPERSION

This is a division of application Ser. No. 08/737,782 filed Nov. 25, 1996 now U.S. Pat. No. 5,925,722 and a 371 of PCT/EP96/01193 Mar. 20, 1996.

BACKGROUND OF THE INVENTION

1. Field of the Invention

Polymer dispersions on an aqueous basis are characterized by the presence of dispersely distributed polymer particles in an aqueous dispersion fluid. For stabilizing a system of this type in which discrete polymer particles, for thermodynamic reasons, tend to coagulate, as a rule, surface active substances are used. The capability of using starch and the derivatives thereof as surface active substances of this type for generating aqueous polymer dispersions has already repeatedly been suggested.

2. Description of the Related Art

EP 0 276 770 is concerned with a sizing agent in the form of an aqueous polymer dispersion wherein a monomer mix of 20–65% acrylonitrile, 80–35% acrylic acid ester and 0–10% of other ethylenically unsaturated monomers in the aqueous phase is copolymerized in one step, using modified starch of a reduced viscosity of 0.04 to 0.12 dl/g.

EP 0 536 597 A1 describes aqueous polymer dispersions obtainable by radical polymerisation of unsaturated monomers containing at least one reduced starch product obtainable by hydrolysis in the aqueous phase and having an average molecular weight of between 2.500 and 25.000. In none of the aforementioned cases, the way of carrying out the radical polymerisation is suitable for preparing an amphoteric copolymer. The afore-mentioned patent applications do not describe any charge characteristics actually required for these systems in order to judge their suitability for special applications, such as sizing and coating.

EP 0 479 245 A2 describe polymers usable as adsorbents for aqueous media, with the polymers being formed by copolymerisation of an ampholytic ion-pair and at least one additional monomer, wherein the said second monomer can be acrylamide, methacrylamide or acrylonitrile. Moreover, the said polymers also contain so called cross-linking agents carrying, in turn, at least 2 olefinic functional groups, with each of these groups being suitable for cross-linking. The polymer, in addition, contains polysaccharides, polypropylene or polyethylene forming in conjunction with the afore-mentioned comonomers a graft polymer. The resultant polymer exclusively contains water-soluble monomers and is formed in a one-step reaction. U.S. Pat. No. 4,552,940 discloses a starch-containing graft polymer generated in the form of an aqueous solution. It was the object of that invention to adjust the viscosity of the starch solution by the addition of styrene. The so adjusted starch solutions can then be employed as adhesives or coating agents. The problem underlying the present invention resides in providing amphoteric aqueous polymer dispersions which with the aid of a suitable process using starch and/or the derivatives thereof, can be generated free of coagulate. Polymer dispersions of this type, with a uniform particle size distribution, should be of a high stability and, through their surface charge, should be compatible both with anionic and cationic systems, and safeguard the use thereof over a wide pH-range.

SUMMARY OF THE INVENTION

The amphoteric polymer dispersions of the invention are available in a multi-step emulsion polymerization, with a finely divided anionic polymer dispersion being generated in the first process step based on a monomer mixture composed of ethylenically unsaturated monomers which, in addition, contain in the mixture unsaturated carbonic, sulphonic and phosphonic acids (monomers A) up to 30% by weight, with the said mixture being polymerized in the presence of starch and/or the derivatives thereof modified by enzyme or acid hydrolysis and with the starch and/or the derivatives thereof being of an average molecular weight of 500–2000, preferably 800–1500 g/mol and an intrinsic viscosity of under 0.1 dl/g. The concentration of the present aqueous starch solutions can amount to up to 40% by weight, preferably 10–35% by weight. The weight ratio of starch to monomeric mixture is between (20:1) and (1:20). The solids content of the so obtained anionic dispersion amounts to between 15 and 45% by weight, preferably 20 to 40% by weight and has a Zeta-potential of between −3 and −70 mV, preferably between −5 and −30 mV. In the presence of the anionic dispersion obtained in step 1 the same is then polymerized with another monomeric mixture which in addition to the ethylenically unsaturated monomers also contains monomers of a cationic (basic) character (monomers B) having a weight of up to 35% by weight, preferably 5 to 20% by weight. The weight ratio between the dispersion prepared in step 1 and the share of monomers added in step 2 is between (10:1) and (1:10), with the solids content of the so produced amphoteric polymer dispersion amounting to between 20 and 55% by weight, preferably between 25 and 45% by weight and having a uniform particle size distribution smaller than 300 nm. To be considered as radically polymerizable monomers are, in particular, monoethylenically unsaturated monomers, such as olefins, vinyl aromatic monomers such as styrene, alpha-methyl styrene, chlorostyrene or vinyl toluene, esters of vinyl alcohol and monocarbonic acids preferably containing 1–18 C-atoms, such as vinyl acetate, vinyl butyrate, vinyl stearate, esters of alpha-, beta mono-ethylenically unsaturated mono- and dicarbonic acids preferably containing 3–6 C-atoms, in particular, acrylic acid, methacrylic acid, maleic acid, fumaric acid with alkanols generally containing 1–2, preferably 1–8, more preferably 1–4 C-atoms, in particular, acrylic acid and methacrylic acid methyl, ethyl, n-butyl, isobutyl, ethyl hexyl and cyclohexyl esters as well as acrylonitrile and conjugated dienes, such as 1,3-butadiene. In addition, functional monomers, such as hydroxyethylacrylate and methacrylate, hydroxypropylacrylate and methacrylate, n-vinyl pyrrolidene, acrylamide, methacrylamide and trimethylolpropane triacrylate are used.

The typical anionic charge characteristic of the dispersion prepared in the first process step is obtained by copolymerization of ethylenically unsaturated carbonic, sulphonic or phosphonic acids. For example, acrylic acid, methacrylic acid, maleic acid, fumaric acid, vinyl sulphonic acid, vinyl phoshonic acid, 2-acrylamidopropane sulphonic acid and styrne sulphonic acid or the alkaline and or alkaline earth salts or ammonium salts can be used in this respect. The weight ratio of starch to monomers, in the first process step, is between 20:1 and 1:20. The share of unsaturated carbonic, sulphonic or phosphonic acids, based on the monomeric amount of the first process step, amounts to up to 30% by weight. In the first process step, the monomeric mixture containing the monomers A is continuously fed to the aqueous starch solution. The reaction temperature is between 40 and 95° C. To the aqueous starch solution both peroxides such as ammonium or alkaline metal peroxide disulphate or $H_2O_2$, and azocompounds are added as water-soluble radical initiators. In combinations with reducing components, such as ascorbic acid, hydroxymethane sulphinic acid, sodium sulphite, sodium hydrogen sulphite of the reducing metal compounds, such as Fe(II)- Ce(IV)- or Mn(II) salts, the initiators, alternatively, can also be dosed in the continuous admixing process. The second process step is characterized in that in the presence of the dispersion prepared in the first process step ethylenically unsaturated monomers are polymerized which also contain nitrogen-containing monomers of a basic character (monomers B), with the polymerization, using water-soluble radical starters and/or a redox system, being carried out at temperatures of between 20 and 95° C. The monomers B are selected from the group of acrylic acid and/or methacrylic acid diaminoalkylesters, for example dimethyl aminoethylmethacrylate, dimethyl aminoethylacrylate and from the group of acrylic acid and/or methacrylic acid diaminoalkylamides, for example, dimethyl aminopropylmethacrylamide, dimethyl aminopropylacrylamide, and from additional basic vinyl compounds, such as n-vinylimidazol, n-vinyl-2-methylimidazolin. Moreover, the quarternized derivatives of the said monomers can be used, with methylchloride, dimethylsulphate, diethylsulphate, ethylchloride and benzylchloride being considered as quarternizing agents. Preferably, a redox system is to be used as the radical initiator for the second process step, with the reaction temperatures being between 20° C. and 95° C. In respect of the initiator system, reduction agents, for example, ascorbic acid, hydroxymethane sulphinic acid sodium salt, sodium sulphite, sodium hydrogen sulphate or reducing metal compounds, such as Fe(II), Ce (IV), Mn(II) salts, preferably in the form of the corresponding sulphates, can be used as reducing components. Suitable oxidants are peroxide and/or hydroperoxide, such as hydrogen peroxide and tert. buthylhydroperoxide, alkaline metal peroxodisulphates or ammonium peroxodisulphates. The addition of a combined initiator system of this type, preferably, is effected in such a way that the reducing component is added together with the dispersion prepared in the first process step and the oxidizing component is dosed simultaneously with the monomer afflux into the system. The so prepared amphoteric polymer dispersions of the invention have a solids content of between 20 and 55% by weight, preferably 25 to 45% by weight and, moreover, are of a uniform particle size distribution of an average particle size smaller than 300 nm which is a direct consequence of the two-phase way of operation. The polymer dispersions of the invention are mainly employed as sizing agents for paper. Furthermore the inventive polymer dispersions can be used as binder for coating pigments and as binder for clear laquer-coatings.

DESCRIPTION OF THE PREFERRED EMBODIMENTS

EXAMPLES OF PREPARATION

Example 1

First Process Step

Placed in a dual-jacket agitator provided with a vane-type stirrer, a reflux condenser and an $N_2$-feed-in conduit are 500 parts of water, and 126 parts of potato starch acetate ester of the 0.03 substitution degree are added under agitation. 0.3 parts of alpha amylase LP are then added, heated to 80° C. and held for 2 hours at this temperature. After the addition of 3 parts of sodium peroxodisulphate dissolved in 15 parts of water a mixture of 30 parts of styrene, 15 parts of n-butylacrylate and 1 part of acrylic acid is continuously added over a period of 40 minutes. After termination of the afflux the mixture is agitated for another 60 minutes at 80° C.

Second Process Step

Added to the resultant dispersion of the first process step at 80° C., is 1 part of hydroxymethane sulphinic acid sodium salt dissolved in 10 parts of water. Immediately thereafter the mixture of 90 parts of styrene and 45 parts of n-butyl acrylate, the mixture of 16 parts of trimethylammonium methylmethacrylate chloride dissolved in 14 parts of water and the mixture of 3 parts of hydrogen peroxide dissolved in 35 parts of water are simultaneously yet separately added continuously over a period of 150 minutes. Thereafter the mixture is stirred for 120 minutes at 85° C., forming after cooling the coagulate-free polymer dispersion of a solids content of 33%, a pH-value of 5.5 and an average particle size of 110 nm.

Example 2

First Process Step

Placed in a dual-jacket 1-1 agitator provided with a vane-type stirrer, a reflux condenser and an $N_2$ feed-in line are 500 parts of water, and 100 parts of potato starch acetate ester of the 0.027 substitution degree are added under agitation. 0.3 parts of alpha-amylase LP are added, heated to 80° C. and held for 2 hours at this temperature. Thereafter, 3 parts of sodium peroxodisulphate dissolved in 15 parts of water are added and the mixture of 40 parts of styrene, 5 parts of n-butyl acrylate and 2 parts of acrylic acid is continuously dosed over a period of 30 minutes. Thereafter the mixture is stirred for another 60 minutes at a temperature of 80° C.

Second Process Step

Added to the resultant dispersion of the first process step is 1 part of hydroxymethane sulphinic acid sodium salt dissolved in 10 parts of water. Immediately thereafter, the mixture of 90 parts of styrene, 45 parts of n-butyl acrylate and 60 parts of dimethylaminoethyl methacrylate and the mixture of 3 parts of hydrogen peroxide dissolved in 35 parts of water are simultaneously yet separately from one another added over a period of 120 minutes. After completion of the admixture, the mix is maintained for another 2 hours at this temperature, then cooled to form the coagulate-free polymer dispersion of a solids content of 33%, a pH-value of 5.0 and an average particle size of about 140 nm.

Example 3

First Process Step

Placed into a 1 1 dual-jacket reactor provided with a vane-type agitator, a reflux condenser and an $N_2$ feed-in line are 500 parts of de-ionized water and 315 parts of a hot-soluble oxidatively decomposed potato starch are added under agitation. Then 0.3 parts of alpha-amylase are added and heated to 80° C. This temperature is maintained for two hours; 3 parts of 37% formaldehyde solution are then added. After the addition of another 3 parts of sodium peroxodisulphate a mix of 15 parts of styrene, 30 parts of n-butylacrylate and 2 parts of acrylic acid is continuously added over a period of 35 minutes. After 1-hour post-polymerization a seed latex of an average particle size of 85 nm of a solids content of 32.5% is obtained.

Second Process Step

Added at 82° C. to the resultant dispersion of the first process step is 1 part of hydroxymethane sulphinic acid sodium salt dissolved in 10 parts of water. Immediately thereafter, a solution of 3 parts of hydrogenperoxide dissolved in 10 parts of water and a solution of 30 parts of trimethylammonium ethylmethacrylate chloride dissolved in 20 parts of water, and a mixture of 90 g styrene and 60 g n-butylacrylate are simultaneously yet separately from one another admixed over a period of 120 minutes. After 1-hour post-copolymerization at this temperature and after the addition of 9 parts of a 20% soda lye the coagulate-free dispersion of an average particle size of about 190 nm, a solids content of 45.5% and a pH-value of 5.3 is obtained.

Example 4

First Process Step

Admitted to a 1-1 dual-jacket agitator provided with a vane-type stirrer, a reflux condenser and an $N_2$ feed-in line are 440 parts of water and 250 parts of a hot-soluble oxidatively decomposed potato starch. Added thereto are 0.2 parts of alpha amylase LP, heated to 80° C. and held at this temperature for 2 hours. Thereafter 1.5 parts of sodium peroxodisulphate dissolved in 10 parts of water are then added and the mixture of 30 parts of styrene, 15 parts of butylacrylate and 6 parts of acrylic acid is continuously admixed over a period of 30 minutes. After conclusion of the admixture stirring is continued for another 60 minutes at a temperature of 80° C.

Second Process Step

Added to the resultant dispersion of the first process step is 1 part of hydroxymethane sulphinic acid sodium salt dissolved in 5 parts of water. Immediately thereafter the mixture of 90 parts of styrene and 45 parts of n-butylacrylate, the solution of 22.5 parts of trimethylammonium methylmethacrylate chloride dissolved in 57.5 parts of water and the solution of 3 parts of hydrogen peroxide dissolved in 30 parts of water are simultaneously yet separately from one another admixed over a period of 120 minutes. After completion of the admixture this temperature is maintained for 2 hours and cooled down. After the addition of 15.5 parts of a 20% by weight sodium hydroxide solution, the coagulate-free polymer dispersion of a solids content of 40.5%, a pH-value of 5.3 and an average particle size of about 270 nm is obtained. Now, the technical advantages involved with the employment of the dispersions of the invention will be described in closer detail. In this connection, the suitability of the dispersions for use as glueing agents or binders for coatings and the high compatibility with a variety of charged paper chemicals will be demonstrated. Table 1 shows the Zeta-potential as a measure for the high compatibility.

The compatibility with optical bleaching agents was tested as follows: 50 g of the dispersion of the invention were diluted with 950 g of water and then mixed with 10 g of an optical bleaching agent of the stilbene type. The compatibility with polyacrylic acid (40% aqueous solution) was tested as follows: 5% by weight of polyacrylic acid were added to the dispersion of the invention. The compatibility with basic pigment was tested as follows: 50 g of the dispersion of the invention were diluted with 950 g of water and then mixed with 5 g of basic pigment. The compatibility with aluminum sulphate was tested as follows: 5% by weight of aluminum sulphate solution (18% $Al_2O_3$) were added to the dispersion of the invention.

Technical Test of the Employment of the Invention as a Surface Sizing Agent; Testing the COBB Value According to DIN-Standard No. 53132

Impregnation was completed on a laboratory sizing press for papers supplied by the Einlehner company with subsequent drying on a photo dryer, type No. 641603 of the Gerster company (Bruchsal) for 2 minutes at 100° C. A 5% enzymatically modified native maize starch of a viscosity of 50 mPaS, a temperature of 50° C., a pH value of 6.8 and a water hardness of 19 dH was used as the glueing solution to which were added the sizing agents listed in Table 2. A paper of wood pulp containing 60% short fiber and 40% long fiber of a grindability of 30 Schopper-Riegler and a filler content of 25% kaolin based on the wood pulp as employed served as base paper. The weight per unit area amounted to 80 g/m². The papers after having been passed through the size press showed a 50% relative size solution absorption resulting in the 50% factually absorbed amount of sizing agent of the concentration listed in Table 2.

TABLE 1

| Example | 1 | 2 | 3 | 4 | Ref. 1 | Ref. 2 | Ref. 3 |
|---|---|---|---|---|---|---|---|
| *Zeta Potential | $-10^1/+8,2^2$ | $-14^1/+12^2$ | $-8^1/+12^2$ | $-16^1/+14,5^2$ | $-25,6$ | $-5,5$ | $-56,4$ |
| Compatibility with optical bleaching agant (anionic auxil.) | +/+ | +/+ | +/+ | +/+ | + | − | + |
| Compatibility with polyacrylic acid (anionic auxil.) | +/+ | +/+ | +/+ | +/+ | + | − | + |
| Compatibility with basic pigment (cationic auxil.) | −/+ | −/+ | −/+ | −/+ | − | + | − |
| Compatibility with aluminum sulphate solutions (cationic auxil) | −/+ | −/+ | −/+ | −/+ | − | + | − |
| Addition of 10% soda lye up to pH 9 | +/+ | +/+ | +/+ | +/+ | + | − | + |
| Viscosity after 1 day storage at 22° C. | 100 | 95 | 85 | 130 | | | |
| Viscosity after 60 day storage at 22° C. | 135 | 105 | 115 | 135 | | | |

The superior numerals 1 and 2 have the following meaning: 1 = primary product value; 2 = final product value
+ means no coagulation and − means immediate heavy coagulation.
Ref.. 1 means: anionic surface sizing agent, 25% dispersion
Ref.. 2 means: cationic surface sizing agent, 20% dispersion.
Ref. 3 means: anionic binder, dispersion on styrene-acrylate basis, 50% dispersion
* The Zeta-potential was measured on a Malvern Zeta Sizer system.
** The viscosity was measured according to the Brookfield Model DV II, using spindle set LV 2 at 60 rpm and 22° C.

TABLE 2

| Example | 1 | 2 | 3 | 4 | Ref. 1 | Ref. 2 |
|---|---|---|---|---|---|---|
| Sizing agent concentration in % | 2,4 | 2,4 | 2,4 | 2,4 | 2,4 | 2,4 |
| pH value | 7,0 | 7,0 | 7,2 | 6,8 | 7,3 | 4,0 |
| Cobb 60" [g/m2] 135 | $41^1/36^2$ | $39^1/34^2$ | $42^1/32^2$ | $38^1/30^2$ | 50 | 35 |

Ref. 1: Anionic surface sizing agent, 25% dispersion
Ref. 2: Cationic surface sizing agent, 20% dispersion
1 = Primary product value; 2 = Final product value Technical Test of the Employment of the Products of the Invention as Binders for Pigmented Coatings Paper coating substances were prepared which when employing the dispersions of the invention notably improved the printability, in particular, the ink-jet printability. The coating substances were prepared by providing the dispersions used as binders, with the pigments or pigment preparations, respectively, added to the aqueous binder under thorough agitation. Subsequently, the solids content of the coating masses was adjusted to 50% by the addition of water. Coating was by a coating blade, with the coating weight being at 12.5 g/m². A full-sized coating base paper (Cobb 60"=22 g/m²) of pure pulp and a weight per unit area of 80 g/m² was used as base paper. After drying of the papers for 2 minutes at 120° C. and air conditioning for 24 hours at 21° C. and 50% relative air moisture the print tests were carried out on a ink jet printer of the Hewlett-Packard type, HP-Desk-Jet model, at 550° C. Printing was in colour mode with the ink depth of black areas (black), bleeding of the black tint on a yellow background and keeness, i.e. wicking of colour and black in non-printed areas, being rated.

TABLE 3

| | | Coatings | | | | | | |
|---|---|---|---|---|---|---|---|---|
| Coating mass | | 1 | 2 | 3 | 4 | Ref. 1 | Ref. 3 | Ref. 4 |
| Share of dispersion acc. to example | 1 | 50 | | | | | | |
| | 2 | | 50 | | | | | |
| | 3 | | | 50 | | | | |
| | 4 | | | | 50 | | | |
| | Ref. 1 | | | | | 50 | | |
| | Ref. 3 | | | | | | 50 | |
| | Ref. 4 | | | | | | | 50 |
| Adjust with NaOH to pH value | | 8,5 | 8,4 | 8,5 | 8,5 | 8,6 | 8,5 | 8,5 |
| Share on CaCO₃- Pigment slurry Quality 90% > 2 μm | | 50 | 50 | 50 | 50 | 50 | 50 | 50 |
| rating „black" | | 2 | 2 | 2 | 1 | 6 | 8 | 3 |
| rating „bleeding" | | 1 | 1 | 1 | 1 | 10 | 10 | 5 |
| rating „wicking" | | 2 | 1 | 1 | 2 | 8 | 10 | |

Ref. 1: anionic surface sizing agent, 25% dispersion
Ref. 3: anionic binder, dispersion on styrene acrylate basis; 50% dispersion
Ref. 4: polyvinylalcohol, 88% saponification, 20% aqueous solution.

Reference Example 5 (One-Step Process; State of Art)

44 parts of water were introduced into a 1-1 dual-jacket agitator provided with vane-type stirrer, reflux condenser and N₂ feed-in line into which 250 parts of starch were introduced under stirring. 0.2 parts of alpha amylase LP were admixed, heated to 90° C. and held for two hours at this temperature. Thereafter, 1 part of hydroxymethane sulphinic acid sodium salt dissolved in 5 parts of water were added. Immediately thereafter, the mixture of 120 parts styrne, 60 parts of n-butylacrylate and 6 parts of acrylic acid, the solution of 22.5 g trimethylammonium methyl methacrylate chloride dissolved in 57 g water and the solution of 3 parts hydrogen peroxide (30% solution) dissolved in 30 parts of water were simultaneously yet separately from one another admixed over a period of 120 minutes. After admixture stirring was continued for another 2 hours at the same temperature. After cooling to ambient temperature and addition of a 20% soda lye of a pH of up to 5, the 40% polymer dispersion was obtained from which 35 parts of coagulate were filtered off. The average particle size was 530 nm.

Reference Example 6

First Process Step:

500 parts of potato starch were introduced into a 1-1 dual-jacket reactor provided with vane-type stirrer, reflux condenser and N₂-feed-in line. Thereafter, 0.08 parts of alpha-amylase were added, heated to 80° C. and held at this temperature for 30 minutes. After mixing with 3 parts of a 30% formaldehyde solution the rest of the test was carried out as in example 3. The viscosity of the product was such that only after dilution with another 400 parts of water a satisfactory fluidity was achieved. With the resultant solids content of 32.5% the viscosity was 300 mPas rising after 12 days again to >15.000 mPas.

TABLE 4

| Example | 1 | 2 | 3 | 4 | 5 | 6 |
|---|---|---|---|---|---|---|
| Average molecular weight of starch | 880 | 800 | 1600 | 1200 | 1200 | 5400 |
| Threshold viscosity of starch solution in dfl/g | 0,03 | 0,04 | 0,06 | 0,05 | 0,05 | 0,20 |
| Coagulation | <0,1% | <0,1% | <0,1% | <0,1% | 3% | <0,1% |
| Viscosity* | 100 | 95 | 85 | 130 | 300 | >15000 |

The viscosity was measured on a Brookfield Viscosimeter, Spindle 1, at 60 rpm at 22° C. in mPas.

Compatibility with Cationic and Anionic Resin Size Dispersions and Cationic Alkyl Ketene Dispersions

TABLE 5

| Example | 1 | 2 | 3 | 4 | Ref. 1 | Ref. 2 | Ref. 3 |
|---|---|---|---|---|---|---|---|
| 1 = anionic resin dispersion | + | + | + | + | + | − | + |
| 2 = cationic resin dispersion | + | + | + | + | − | + | − |
| 3 = cationic alkyl ketene dimer dispersion | + | + | + | + | − | + | − |

+ = without precipitation
− = with precipitation (coagulate formation)
1 = anionic resin size dispersion: Zeta-potential: −24.0 mV
2 = cationic resin glue dispersion: Zeta-potential: +38.1 mV
3 = cationic alkyl ketene dimer dispersion: zeta-potential: +21.0 mV
Ref. 1: Anionic surface glueing agent, 25% dispersion
Ref. 2: Cationic surface sizing agent, 20% dispersion
Ref. 3: Anionic binder, dispersion on styrene acrylate basis, 50% dispersion.

Technical Test on the Employment of the Dispersions of the Invention as Mass Sizing Agents in Combination with Another Sizing Agent System This example shows the effect of the dispersions of the invention in combination with other sizing agents, in particular, with alkyl ketene dimer-containing systems. The advantage involved with the mixtures over individual components is particularly notable. A recycling paper of the following composition is produced on a Kämmerer test machine: 50% newspaper and 50% magazines and periodicals. During the paper manufacture, 0.04% by weight of cationic polyacrylamide were additionally added continuously in predetermined doses to the diluant as a retention agent. The pH-value in the flow box amounted to 7.0–7.3 and the machine speed was 2.5 m/min. In the dry section, the maximum temperature was 105° C. The product prepared in example 4 and a cationic alkyl ketene dispersion and the mixture of the two products at a weight ratio of 1:1 and 2:1 were employed as the sizing agent. The addition of the sizing agent was before the retention agent. The weight per unit of area of the paper as produced respectively amounted to 80 g/cm$^2$. The sizing values obtained with the sizing agents as employed are summarized in Table 6. The test was carried out after storage of the papers for 10 minutes at 105° C.

TABLE 6

| | Mass sizing | |
|---|---|---|
| Product | Dosage | Cobb 60 [g/m2] |
| cationic alkyl ketene dimer dispersion | 4% | 100 |
| | 5% | 96 |
| Example 4 | 4% | 114 |
| | 5% | 114 |
| Example 4 with alkyl ketene dimer dispersion at a weight ratio of 2:1 | 4% | 34 |
| | 5% | 23 |
| Example 4 with alkyl ketene dispersion at a weight ratio of 1:1 | 4% | 36 |
| | 5% | 22 |

What is claimed is:

1. An anionic polymer dispersion, produced by a process comprising:
   a. decomposing a starch by one of treatment with an enzyme effective therefor or acid hydrolysis to provide a starch solution comprised of decomposed starch and/or derivatives thereof, with the decomposed starch and/or derivatives thereof having an average molecular weight ranging from 500 to 2000 g/mole and with the starch solution having an internal viscosity <0.1 dl/g; and
   b. polymerizing a monomer mixture comprised of ethylenically unsaturated monomers containing up to 30% by weight of monomers of anionic character (monomers A) selected from the group consisting of ethylenically unsaturated carbonic, sulphonic and phosphonic acids in the presence of from an effective amount up to 40% by weight of the starch solution to provide an anionic polymer dispersion, with the weight ratio of starch to monomer mixture ranging from 20:1 to 1:20 and with the anionic polymer dispersion having a solids content ranging from 15 to 45% by weight and having a zeta-potential ranging from −3 to −70 mV.

2. An amphoteric aqueous polymer dispersion, produced by a process comprising:
   a. decomposing a starch by one of treatment with an enzyme effective therefor or acid hydrolysis to provide a starch solution comprised of decomposed starch and/or derivatives thereof, with the decomposed starch and/or derivatives thereof having an average molecular weight ranging from 500 to 2000 g/mole and with the starch solution having an internal viscosity <0.1 dl/g;
   b. polymerizing a monomer mixture comprised of ethylenically unsaturated monomers containing up to 30% by weight of monomers of anionic character (monomers A) selected from the group consisting of ethylenically unsaturated carbonic, sulphonic and phosphonic acids in the presence of from an effective amount up to 40% by weight of the starch solution to provide an anionic polymer dispersion, with the weight ratio of starch to monomer mixture ranging from 20:1 to 1:20 and with the anionic polymer dispersion having a solids content ranging from 15 to 45% by weight and having a zeta-potential ranging from −3 to −70 mV; and
   c. polymerizing the anionic polymer dispersion of step (b) with another monomer mixture which contains the ethylenically unsaturated monomers and up to 35% by weight of monomers of cationic character (monomers B) to provide an amphoteric aqueous polymer dispersion, with the weight ratio between the anionic polymer dispersion of step (b) and the another monomer ranging from 10:1 to 1:10 and with the amphoteric aqueous polymer dispersion having a solids content ranging from 20 to 55% by weight and having a uniform particle size distribution.

3. A process of sizing an article selected from the group consisting of paper, cardboard and cardboard boxes, the process comprising:
   providing a sizing agent comprised of an anionic polymer dispersion according to claim 1; and
   applying the sizing agent comprised of the anionic polymer dispersion separately or in combination with other sizing agents to the article.

4. A process of sizing an article selected from the group consisting of paper, cardboard and cardboard boxes, the process comprising:
   providing a sizing agent comprised of an amphoteric aqueous polymer dispersion according to claim 2; and
   applying the sizing agent comprised of the amphoteric aqueous polymer dispersion separately or in combination with other sizing agents to the article.

5. A process of binding for printing and dye industries, the process comprising:

provautomating a binder comprised of an amphoteric aqueous polymer dispersion according to claim 2; and including the binder comprised of the amphoteric aqueous polymer dispersion in a binder system for printing and dye industries.

6. A process of coating a substrate selected from the group consisting of paper, wood, metal and glass, the process comprising:

providing a coating composition which is comprised of an amphoteric aqueous polymer dispersion according to claim 2 and which is one of pigment-containing or pigment-free; and applying the coating composition onto the substrate.

7. A process of lining a substrate selected from the group consisting of paper, wood, metal and glass, the process comprising:

providing a lining composition which is comprised of an amphoteric aqueous polymer dispersion according to claim 2 and which is one of pigment-containing or pigment-free; and applying the lining composition onto the substrate.

* * * * *